United States Patent
Kim et al.

(10) Patent No.: US 11,704,842 B2
(45) Date of Patent: *Jul. 18, 2023

(54) DIGITAL OVERPAINTING CONTROLLED BY OPACITY AND FLOW PARAMETERS

(71) Applicant: Adobe Inc., San Jose, CA (US)

(72) Inventors: Byungmoon Kim, Sunnyvale, CA (US); Jinyi Kwon, Seoul-si (KR)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/111,903

(22) Filed: Dec. 4, 2020

(65) Prior Publication Data
US 2021/0090305 A1    Mar. 25, 2021

Related U.S. Application Data

(63) Continuation of application No. 16/136,897, filed on Sep. 20, 2018, now Pat. No. 10,891,760.

(51) Int. Cl.
*G06T 11/00* (2006.01)
*G06F 3/04883* (2022.01)
(Continued)

(52) U.S. Cl.
CPC .......... *G06T 11/001* (2013.01); *G06F 3/0354* (2013.01); *G06F 3/0482* (2013.01);
(Continued)

(58) Field of Classification Search
CPC ............. G06F 3/04883; G06F 3/03545; G06F 3/0317; G06F 3/0412; G06F 3/0416;
(Continued)

(56) References Cited

U.S. PATENT DOCUMENTS

2013/0120394 A1    5/2013  DiVerdi et al.
2013/0120433 A1*   5/2013  DiVerdi ............... G06T 11/001
                                                   345/593

FOREIGN PATENT DOCUMENTS

| CN | 110930468    | 3/2020 |
| DE | 102019005853 | 3/2020 |
| GB | 2578506      | 5/2020 |

OTHER PUBLICATIONS

United Kingdom Application No. GB1912162.3, Examination Report dated Apr. 29, 2021, 3 pages.

(Continued)

*Primary Examiner* — Xiao M Wu
*Assistant Examiner* — Scott E Sonners
(74) *Attorney, Agent, or Firm* — Kilpatrick Townsend & Stockton LLP

(57) ABSTRACT

Certain embodiments involve a graphics manipulation application using brushstroke parameters that include a maximum alpha-deposition parameter and a fractional alpha-deposition parameter. For instance, the graphics manipulation application uses an alpha flow increment computed from the maximum alpha-deposition parameter and the fractional alpha-deposition parameter to compute an output canvas color. In some embodiments, if the current canvas opacity exceeds or equals the maximum alpha-deposition parameter, the current canvas opacity is selected as the output canvas opacity. Otherwise, the graphics manipulation application computes the output canvas opacity by increasing the current canvas opacity based on the alpha flow increment. The graphics manipulation application updates a canvas portion affected by a brushstroke input to include the output canvas opacity and the output canvas color.

20 Claims, 5 Drawing Sheets

(51) Int. Cl.
*G06F 3/0482* (2013.01)
*G06T 11/20* (2006.01)
*G06T 11/40* (2006.01)
*G06T 11/60* (2006.01)
*G06F 3/0354* (2013.01)
*G06T 11/80* (2006.01)

(52) U.S. Cl.
CPC ........ *G06F 3/04883* (2013.01); *G06T 11/203* (2013.01); *G06T 11/40* (2013.01); *G06T 11/60* (2013.01); *G06T 11/80* (2013.01)

(58) Field of Classification Search
CPC ........ G06T 11/203; G06T 11/60; G06T 11/00; G06T 11/20; G06T 11/40; G06T 11/80; G06K 9/00416; G06K 9/222
See application file for complete search history.

(56) References Cited

OTHER PUBLICATIONS

U.S. Appl. No. 16/136,897, First Action Interview Office Action Summary, dated May 15, 2020, 5 pages.
U.S. Appl. No. 16/136,897, First Action Interview Pilot Program Pre-Interview Communication, dated Feb. 24, 2020, 4 pages.
U.S. Appl. No. 16/136,897, Notice of Allowance, dated Oct. 5, 2020, 8 pages.
Application No. GB1912162.3, Search Report dated Feb. 25, 2020, 6 pages.
Application No. AU2019221218, First Examination Report, dated Jul. 29, 2021, 4 pages.
Application No. AU2019221218, Notice of Acceptance, dated Sep. 6, 2021, 4 pages.

* cited by examiner

DIGITAL OVERPAINTING CONTROLLED BY OPACITY AND FLOW PARAMETERS

CROSS-REFERENCE TO RELATED APPLICATIONS

This application is a Continuation of U.S. application Ser. No. 16/136,897, filed Sep. 20, 2018, the contents of which are incorporated herein by this reference.

TECHNICAL FIELD

This disclosure relates generally to computer-implemented methods and systems for computer graphics processing. Specifically, the present disclosure involves digital overpainting controlled by tunable opacity and flow parameters.

BACKGROUND

Certain graphics manipulation applications are used to digitally implement drawing operations that would be performed by hand. For instance, a graphics manipulation application could include features that approximate, in a digital canvas, the textures and blending effects that would be accomplished using drawing tools such as pencils, pens, markers, and watercolor brushes on paper.

An example of these features is an overpaint operation. Overpainting operations in a graphics manipulation application involve replacing color information, such as a first set of RGB values in a portion of a digital canvas, with updated color information, such as a second set of RGB values associated with a "brush" tool. These overpainting operations digitally approximate the effect of real-world painting techniques, such as adding water to a painted area, absorbing pigment from the paint with tissue paper, and then painting over the area with different color. These real-world painting techniques are used to replace pigment in painted artwork while maintaining the density of the paint.

But overpainting operations in existing graphics manipulation applications involve limitations with respect to accurately and intuitively modifying digital artwork to achieve the same visual effects as real-world artwork. Some graphics manipulation applications control opacity and flow for digital brushstrokes, where opacity (or "alpha") controls the extent to which an existing canvas color is visible through an applied brush color and flow controls the degree to which the brush color is applied in a given brushstroke input. These two parameters are often independently modified. As a result, digitally implementing an overpainting operation often involves first applying a new color to a canvas portion using a first set of brushstrokes, and then reducing the opacity of the canvas portion with a second set of brush strokes or other tool. This overpainting operation is less efficient, since a user must modify the same area twice to achieve a desired opacity, and less intuitive, since using two sets of operations obscures the original target area.

FIGS. 1-3 depict an example of the sub-optimal effect obtained by existing overpainting techniques in a graphics manipulation application. FIG. 1 depicts an example of a graphics manipulation application using a digital canvas 100 to present digital artwork 102. The digital artwork 102 has a gray color with an opacity of less than 100%, thereby allowing some of the canvas to be viewed through the digital artwork 102. The graphics manipulation application modifies, responsive to brushstroke inputs entered via a painting tool 104, the digital artwork 102 to include a painted area 106 having an opaque white color. FIG. 2 depicts an example of a set of brushstroke operations that digitally overpaint the painted area 106. In this example, the graphics manipulation application applies, responsive to another set of brushstroke inputs using a modified painting tool 202, an opaque gray color that replaces the opaque white color. FIG. 3 depicts an example of an additional operation to modify the opacity of the overpainted area to less than 100%, thereby completing the erasure of the painted area 106. In this example, the graphics manipulation application reduces, responsive to one or more user inputs via the tool 302, the transparency of the digital canvas in an area 304.

Therefore, existing solutions may involve disadvantages for reasons such as (but not limited to) those described above.

SUMMARY

Certain embodiments involve digital overpainting controlled by tunable opacity and flow parameters. In one example, a graphics manipulation application accesses, for a received brushstroke input, brushstroke parameters that include a maximum alpha-deposition parameter and a fractional alpha-deposition parameter. The brushstroke parameters, which can be modified by user inputs, control how an opacity and color of the digital canvas is modified responsive to the brushstroke input being applied to the digital canvas. For instance, the graphics manipulation application uses an alpha flow increment computed from the maximum alpha-deposition parameter and the fractional alpha-deposition parameter to compute an output canvas color. In some embodiments, the graphics manipulation application also obtains an output canvas opacity based on a current canvas opacity and the maximum alpha-deposition parameter. For instance, if the current canvas opacity is greater than or equal to the maximum alpha-deposition parameter, the graphics manipulation application selects the current canvas opacity as the output canvas opacity. Otherwise, the graphics manipulation application computes a new output canvas opacity by increasing the current canvas opacity according to the alpha flow increment. The graphics manipulation application updates a portion of the digital canvas that is edited with the brushstroke input to include the output canvas opacity and the output canvas color.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
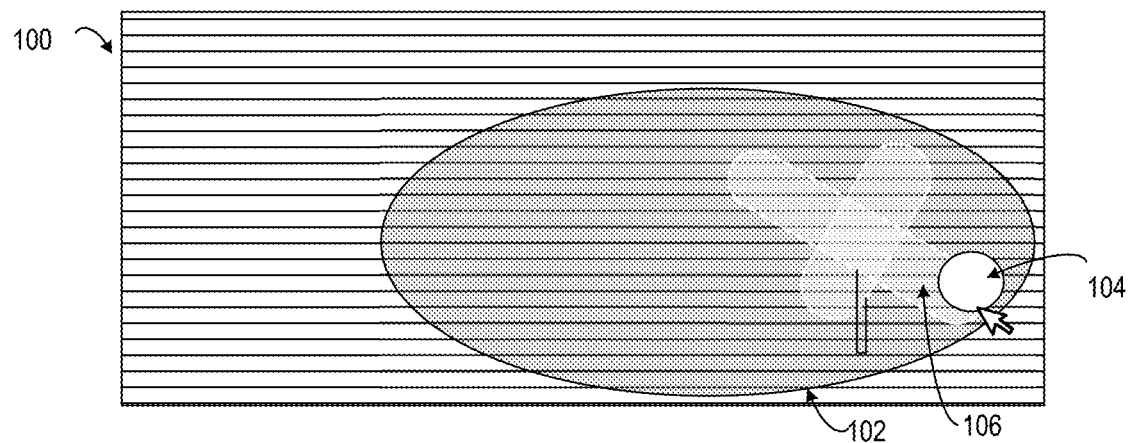
FIG. 1 depicts an example of a graphics manipulation application using a digital canvas to present digital artwork.

The present disclosure includes systems and methods for digital overpainting controlled by tunable brushstroke parameters such as opacity and flow. As discussed above, existing digital overpainting often fails to update color information in an intuitive or efficient manner, with different tools often required for removing existing graphics (i.e., "erasing" pigment) and adding new graphics (i.e., adding new "paint" or "pigment") that are visually consistent with existing graphics on a canvas. Certain embodiments described herein address these limitations by using a combination of user-selected brushstroke parameters and a current opacity of a digital canvas to control how a brushstroke input increases the opacity of the digital canvas when applying new color information. For instance, a graphics manipulation application could implement opacity changes from a given brushstroke input based on user-selected values of brushstroke parameters, while also constraining the opacity change based on a current opacity of the digital canvas. Thus, if a blue digital canvas is less opaque in a first region and more opaque in a second region, a first set of brushstrokes will change the color of the first region more rapidly than a second set of brushstrokes applied to the second region, without requiring selection of a different brush tool or a reconfiguration of the opacity or flow of the currently selected brush tool.

The following non-limiting example is provided to introduce certain embodiments. In this example, a graphics manipulation application is used to edit graphical content displayed on a digital canvas of the graphics manipulation application. The graphics manipulation application receives a brushstroke input indicating an edit to the digital canvas. The graphics manipulation application accesses user-modifiable brushstroke parameters that control how an opacity and color of the digital canvas is modified responsive to the brushstroke input. One brushstroke parameter is a maximum alpha-deposition parameter. An alpha deposition is a change in opacity (i.e., an alpha channel value), where the maximum alpha-deposition parameter controls a maximum change in opacity resulting from brushstroke inputs. In one example, the maximum alpha-deposition parameter is a maximum opacity than can be obtained by applying one or more brushstroke inputs in a certain digital canvas portion. For instance, if a canvas portion has an opacity of 0.2 (with possible opacity values from 0 to 1) and a brush tool is configured with a maximum alpha-deposition parameter of 0.8, the maximum change in opacity from applying a set of brushstrokes will be limited to 0.6 (i.e., the change from the current opacity to the maximum opacity). Another brushstroke parameter is a fractional alpha-deposition parameter, which controls a fraction of the maximum alpha-deposition parameter applied in each brushstroke input (e.g., a "flow" rate of color from the brush tool). For instance, if a canvas portion has an opacity of 0.2 and a brush tool is configured with a maximum alpha-deposition parameter of 0.8, the fractional alpha-deposition parameter will control how many brushstroke inputs from the configured brush tool are needed to increase the canvas portion's opacity from 0.2 to 0.8.

Continuing with this example, the graphics manipulation application computes updated canvas display data, which includes an output canvas color and an output canvas opacity, based on the user-selected values of the maximum alpha-deposition parameter and the fractional alpha-deposition parameter. For instance, the graphics manipulation application computes, from the maximum alpha-deposition parameter and the fractional alpha-deposition parameter, an alpha flow increment that is used to compute an output canvas color. In one example, an output canvas color can be a weighted combination of a current canvas color and a color with which the brushstroke input is configured. If the alpha flow increment (computed from the brushstroke parameters) is large relative to a current canvas opacity (i.e., an opacity value of the canvas prior to the brushstroke being applied), then the brushstroke input's color is weighted more heavily; otherwise, the current canvas color is weighted more heavily.

In some embodiments, the graphics manipulation application also computes or selects an output canvas opacity based on the maximum alpha-deposition parameter. For instance, if the current canvas opacity is greater than or equal to the maximum alpha-deposition parameter, the graphics manipulation application selects the current canvas opacity as the output canvas opacity. Otherwise, the graphics manipulation application computes a new output canvas opacity by increasing the current canvas opacity according to the alpha flow increment (i.e., an increment computed from the brushstroke parameters). As explained further herein, the alpha flow increment is constrained to be less than or equal to the maximum alpha-deposition parameter. Thus, the output canvas opacity is either maintained in response to a brushstroke input (i.e., if the current opacity equals or exceeds the user-selected maximum alpha-deposition) or is increased to the maximum opacity value in a visually appealing manner controlled by the user-selected brushstroke parameters. The graphics manipulation application updates a digital canvas portion affected by the brushstroke input to include the output canvas opacity and the output canvas color.

As illustrated by this example, certain embodiments control a digital overpainting operation based on both the user-specified brushstroke parameters and a canvas opacity at a canvas portion edited with a brushstroke input. For instance, if a current canvas opacity is lesser than a user-selected maximum alpha deposition, applying brushstroke inputs increases the canvas opacity from the current canvas opacity to the user-selected maximum alpha deposition. The user-selected fractional alpha deposition controls how much the canvas opacity approaches the user-selected maximum alpha deposition with each brushstroke input. Conversely, if a current canvas opacity is greater than a user-selected maximum alpha deposition, applying brushstroke inputs only blends color information from the brush tool with an existing canvas color, without changing the canvas opacity.

As used herein, the term "brushstroke input" refers to an input that is directed to a specific portion of a digital canvas and that triggers an operation changing the color information in the specific portion of the digital canvas. In one example, a graphics manipulation application allows for the selection of different tools (e.g., a line-drawing tool, a region-filling tool, an area-painting tool) with which brushstroke inputs are performed. If the graphics manipulation application is configured to use one of these tools (e.g., via a selection input), user inputs such as mouse drags, taps on a touch screen, mouse clicks, dragging motions on a touch screen, click-and-hold operations, and other suitable user-generated events are used as brushstroke inputs. These brushstroke inputs indicate that a digital canvas portion identified with the user-generated event, such as an area where a dragging input was detected, should be updated using color information associated with the brushstroke input, such as a color selected from a digital palette of the graphics manipulation application.

As used herein, the term "digital canvas" refers to a graphical user interface that is generated by a computing device executing a graphics manipulation application and displayed by a display device that is included in or communicatively coupled to the computing device. A digital canvas is generated and rendered for display using canvas display data. Canvas display data includes color information such as, but not limited to, a set of red, green, and blue (RGB) values used to specify, for each pixel of the digital canvas, a color (i.e., the respective intensities of red, green, and blue that, when combined, display a particular color at a particular pixel). Canvas display data can also include canvas opacity data identifying an opacity at one or more positions of the digital canvas, one or more layers of the digital canvas, or some combination thereof.

As used herein, the term "opacity" is used to refer to the degree to which a digital canvas portion (or a graphical object located at the digital canvas portion) remains visible after a brushstroke input has applied color to the digital canvas portion. In some embodiments, a graphics manipulation application controls opacity using an alpha channel in an image. An alpha channel is a mask that specifies how a pixel's colors should be merged with another pixel when the two are overlaid. In one example, if an alpha channel has an available range of values between 0 and 1, an alpha channel (or opacity) value of 0 for a first pixel set indicates that the first pixel set is fully transparent with respect to a second pixel set overlaid on the first pixel set.

As used herein, the term "alpha deposition" is used to refer to an increase in opacity of a digital canvas portion responsive to a brushstroke input being applied to the digital canvas portion. For instance, if a digital brush tool is configured with a red color and is used to edit a digital canvas portion with a blue color, an alpha deposition will control the extent to which the blue graphic is mixed with (i.e., is visible beneath) the red graphic applied by the brushstroke input. If the brushstroke has a larger alpha deposition, the canvas appearance will have a more reddish appearance after the brushstroke. If the brushstroke has a smaller alpha deposition, the canvas appearance will have a purplish appearance (i.e., a blend of the red and blue) after the brushstroke.

As described herein, certain embodiments provide improvements in graphics processing by automatically applying various rules of a particular type, such as computations of opacity and color changes from user-tunable brushstroke parameters as constrained by a digital canvas opacity, to control the manner in which computing devices control how digital overpainting is performed. For example, these embodiments automatically compute incremental changes in opacity and canvas color that occur with each brushstroke. Furthermore, using the same set of brushstroke parameters and current canvas opacity to compute these changes allows for modifying color and opacity in a set of brushstrokes performed by the same editing tool. This process reduces or eliminates the need to switch between an "erasing" brush tool, which removes an existing graphic portion from a surrounding graphic, and a "painting" brush tool, which requires independently tuning opacity and flow parameters in a trial-and-error process to find a desirable opacity-flow combination for matching newly applied digital paint to the surrounding graphic. The automated application of these rules are facilitated by and specifically improve digital graphic editing. By contrast, overpainting operations performed by an artist on a physical canvas require subjective determinations applied to imprecise manual operations, such as how much water to add to a brush when removing wet paint and how much paint to add the brush when replacing the removed paint. Thus, embodiments described herein improve computer-implemented processes that are unique to digital overpainting, thereby providing a more suitable solution for automating tasks previously performed by humans.

Operating Environment Example for Digital Overpainting

Figure 4:
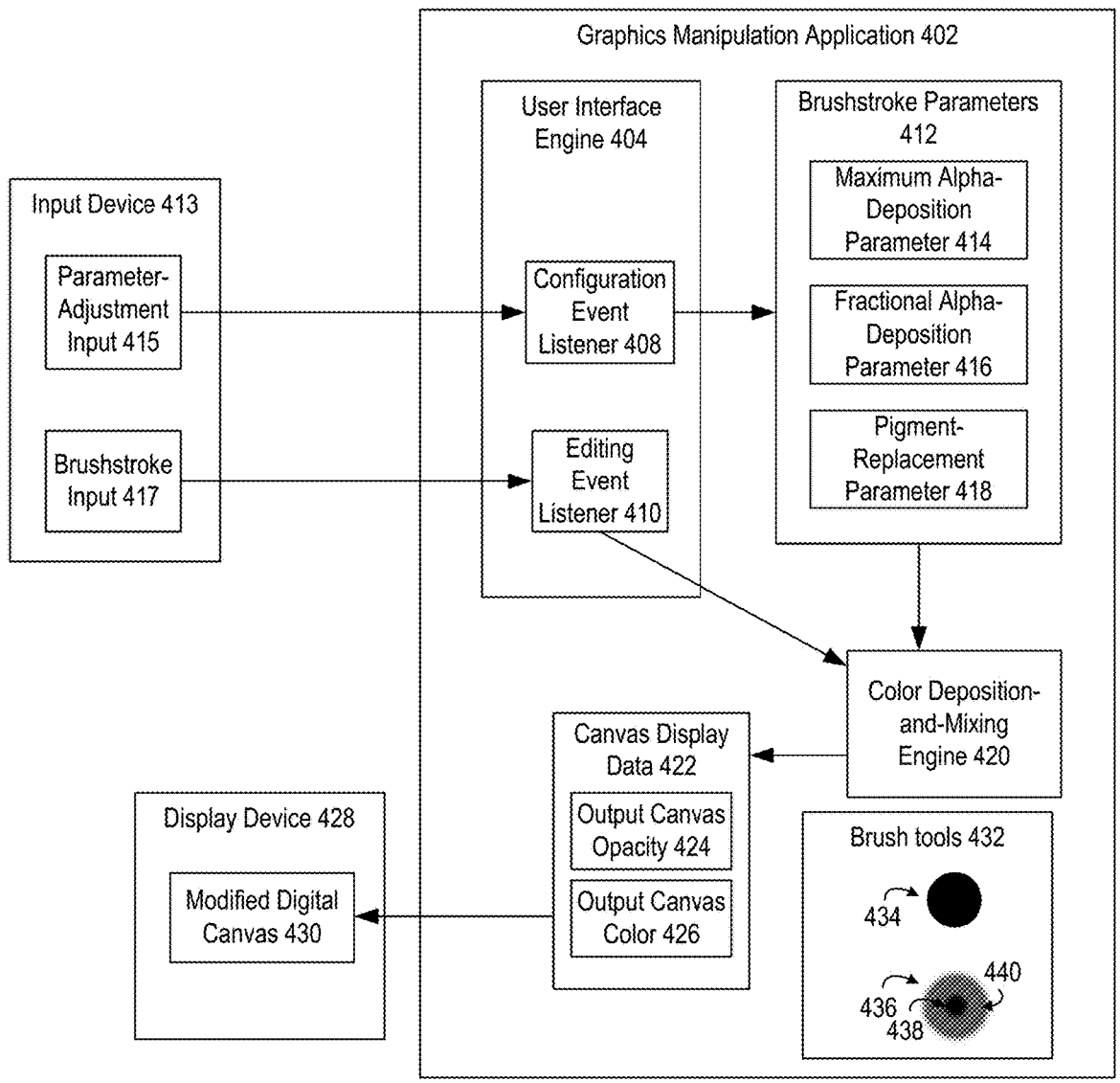
FIG. 4 depicts an example of a computing environment for using a graphics manipulation application to perform digital overpainting controlled by tunable opacity and flow parameters, according to certain embodiments of the present disclosure.

Referring now to the drawings, FIG. 4 depicts an example of a computing environment 400 for using a graphics manipulation application 402 to perform digital overpainting controlled by tunable opacity and flow parameters. The computing environment 400 includes one or more processing devices that execute a graphics manipulation application 402, an input device 413 for providing commands to the graphics manipulation application 402, and a display device 428 that is controlled based on the graphics manipulation application 402.

The graphics manipulation application 402 includes a user interface engine 404. The user interface engine 404 includes one or more modules that detect events generated by an input device 413 that is operated by a user. Examples of an input device 413 include a touchscreen, a mouse, a keyboard, a stylus, etc. The user interface engine 404 implements commands indicated by the user-generated events. Examples of these user-generated events include mouse clicks, dragging inputs, taps, pinches, applying pressure with a stylus, etc.

In one example, the user interface engine 404 includes a configuration event listener 408. The configuration event listener 408 detects events, such as data entry in certain fields or menu selections, that are used to set one or more configuration parameters of the graphics manipulation application 402. One example of a configuration parameter is a selection of a certain type of tool to be applied by the graphics manipulation application 402 (e.g., an erasing tool, a brush tool, etc.). Another example of a configuration parameter is the brushstroke parameters 412. The brushstroke parameters 412 control changes in one or more visual characteristics of a digital canvas in response to a brushstroke input 417. The user interface engine 404 can present, in a graphical interface, one or more interface elements (e.g., menus, pop-up dialogs, etc.) that allow an input device 413 to manually specify, select, or otherwise input values of brushstroke parameters 412.

The user interface engine 404 detects brushstroke inputs 417 and other editing events using an editing event listener 410. For instance, the editing event listener 410 could detect a combination of events, such as a mouse click and a mouse drag, that are located or otherwise directed to a portion of a graphical interface in which a digital canvas is displayed. The user interface engine 404 causes one or more other engines of the graphics manipulation application 402 to perform editing actions based on the detected editing events. For instance, the user interface engine 404 could instruct or otherwise cause a color deposition-and-mixing engine 420 of the graphics manipulation application 402 to modify canvas display data that constitutes a portion of a digital canvas to which a brushstroke input 417 is directed.

For instance, the color deposition-and-mixing engine 420 computes canvas display data 422 in response to a brushstroke input 417 as configured with user-modifiable brushstroke parameters 412. The canvas display data 422 includes an output canvas opacity 424. The output canvas opacity 424 specifies an opacity (e.g., an alpha channel value) used for rendering an update to a canvas display portion to which a brushstroke input 417 is applied (e.g., the canvas display portion in which the brushstroke input 417 is received or is otherwise directed). The canvas display data 422 also includes an output canvas color 426. The output canvas color 426 includes color information (e.g., RGB values or values for another color model implemented with the display device 428) used for rendering the update to the canvas display portion to which the brushstroke input 417 is applied. The display device 428 updates a graphical interface to include a modified digital canvas 430 that is rendered in accordance with the canvas display data 422.

The color deposition-and-mixing engine 420 computes the canvas display data 422 based on one or more of the brushstroke parameters 412. The brushstroke parameters 412 include one or more of a maximum alpha-deposition parameter 414, a fractional alpha-deposition parameter 416, and a pigment-replacement parameter 418.

The maximum alpha-deposition parameter 414 controls a maximum change in opacity resulting from one or more brushstroke inputs 417. An increased opacity corresponds to a positive alpha-deposition value. In some embodiments, the maximum alpha-deposition parameter 414 specifies a maximum opacity for a portion of a digital canvas to which a brushstroke input 417 is applied (e.g., saturating a digital canvas to a maximum point). In additional or alternative embodiments, the maximum alpha-deposition parameter 414 specifies a maximum opacity for a portion of a digital canvas to which a brushstroke input 417 is applied.

In some embodiments, the maximum alpha-deposition applied by given portion of a brushstroke input 417 may vary, due to changes in texture within a region encompassed by a given brush tool, from the maximum alpha-deposition parameter 414 set by a parameter-adjustment input 415. For instance, brush tools 432 can be defined by brush stamps, where no pigment is applied outside the boundary of the brush stamp. In a simplified example, a brushstroke input 417 that involves a single, stationary mouse click with brush stamp 434 would perform a uniform painting operation within the boundary of the brush stamp 434, such that all pixels within the boundary of the brush stamp 434 are set to a black color. Some brush stamps can apply pigment with different textures to replicate a physical brush. In another simplified example, a brush stamp 436 could be configured to apply pigment to all pixels overlapped by a center 438 of the brush stamp 436 and fewer than all pixels overlapped by the softer edges 440 of the brush stamp 436.

To account for these changes in pigment-application within the boundary of a given brush stamp, the color deposition-and-mixing engine 420 computes different maximum alpha-deposition values within a stamp based on the maximum alpha-deposition parameter 414. For instance, an initial maximum alpha-deposition parameter value specified by a parameter-adjustment input 415 can be represented by $B'_a$. A corresponding maximum alpha-deposition parameter value within a certain location in a brush stamp can be represented by represented as $B_a$. The maximum alpha-deposition parameter value $B_a$ can be computed with a function BrushStamp($B'_a$), that modifies $B'_a$ based on, for example, a relative location within the brush stamp. In the example above, where a brush stamp applies pigment to all pixels overlapped by a center of the brush stamp and fewer than all pixels overlapped by the edges of the brush stamp, $B_a$ could be equal to nearly equal to $B'_a$ at the center of the brush stamp, while $B_a$ could be significantly less than $B'_a$ at the edges of the brush stamp. Any suitable function can be used to implement BrushStamp($B'_a$). For instance, BrushStamp($B'_a$) could be a complex function of a relative-to-brush location, a time, and previous brush tool states, etc.

The fractional alpha-deposition parameter 416 controls a fraction of the maximum alpha-deposition parameter 414 that is applied in each brushstroke input. For instance, a user-specified value of the fractional alpha-deposition parameter 416 can indicate that a larger or smaller number of brushstroke inputs 417 are required for increasing a canvas opacity to a maximum canvas opacity, which is indicated by a user-specified value for the maximum alpha-deposition parameter 414. The change in opacity triggered by each brushstroke input 417 can be computed based on weighting, with the fractional alpha-deposition parameter 416, the maximum alpha-deposition parameter 414 or an alpha-deposition value derived from the maximum alpha-deposition parameter 414. In some embodiments, the color deposition-and-mixing engine 420 uses this weighted alpha-deposition to compute how many brushstroke inputs 417 are required to increase an opacity of a digital canvas portion to a maximum opacity (e.g., how many times output canvas opacity 424 must be re-computed and applied responsive to various brushstroke inputs 417). Detailed examples of computing this change in opacity are described herein with respect to FIG. 5.

In some embodiments, the color deposition-and-mixing engine 420 constrains an impact of the maximum alpha-deposition parameter 414 based on a current canvas opacity. For instance, if the current canvas opacity is greater than or equal to the maximum alpha-deposition, the color deposition-and-mixing engine 420 maintains the current canvas opacity as the output canvas opacity 424 in a computation of the canvas display data 422. Thus, in an illustrative example, a brushstroke input 417 applying a red color to a blue graphic having an opacity of 0.5 will simply blend the blue and red colors without increasing opacity, resulting in a purple graphic with the same opacity of 0.5. But if the current canvas opacity is less than the maximum alpha-deposition, the color deposition-and-mixing engine 420 increases and computes an updated output canvas opacity 424 that is different from the current canvas opacity. Thus, in an illustrative example, a brushstroke input 417 applying a red color to a blue graphic having an opacity of 0.3 could blend the blue and red colors and increase opacity, resulting in a purple graphic with the same opacity of 0.7.

In some embodiments, the pigment-replacement parameter 418 controls an amount of canvas color replaced by brush color from the brushstroke input. The pigment-replacement parameter 418 could indicate how many brushstroke inputs 417 are required to change a color of a canvas portion. For instance, the color deposition-and-mixing engine 420 generates an output canvas color 426 by executing a color-mixing function. Inputs to the color-mixing function include a current canvas color, a brush color selected for the brushstroke input (e.g., using a configuration input detected by the configuration event listener 408), and a color mixing factor that is computed based, at least in part, on the pigment-replacement parameter 418.

The color mixing factor, which controls respective contributions of the brush color and current canvas color to the color-mixing function, can be computed independently of a change in opacity. Thus, even in the illustrative example above in which no opacity change occurs, the color of a canvas portion is updated. For instance, if multiple brushstroke inputs 417 with red brush color are applied to a blue canvas region, the canvas color could eventually be changed from blue to red. If the pigment-replacement parameter 418 (and the resultant color mixing factor) is small, the change from blue to red requires a larger number of brushstroke inputs 417. If the pigment-replacement parameter 418 (and the resultant color mixing factor) is larger, the change from blue to red requires a smaller number of brushstroke inputs 417.

Examples of Computer-Implemented Operations for Digital Overpainting

Figure 5:
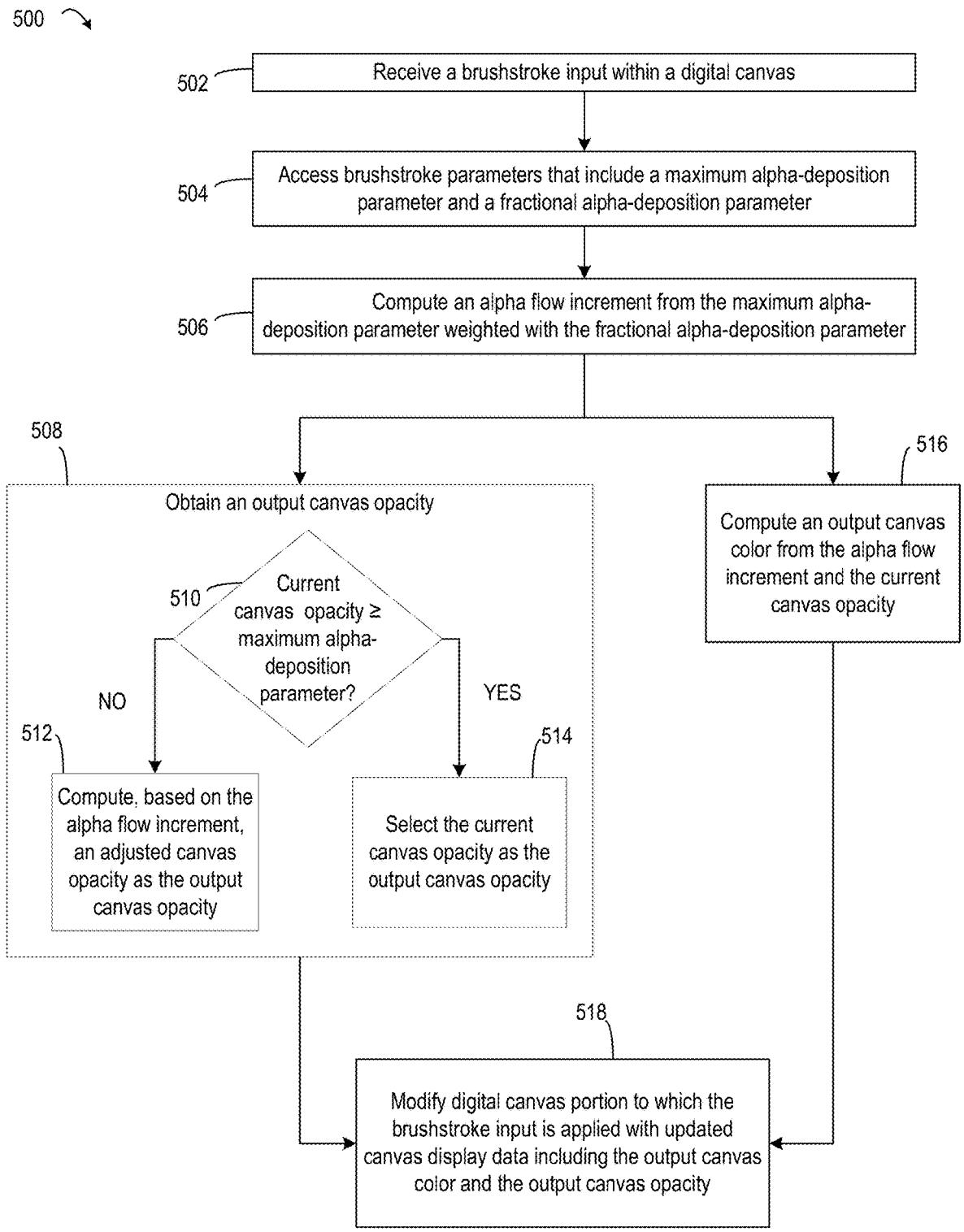
FIG. 5 depicts an example of a process for performing digital overpainting controlled by brushstroke parameters, according to certain embodiments of the present disclosure.

FIG. 5 depicts an example of a process 500 for performing digital overpainting controlled by brushstroke parameters, according to certain embodiments of the present disclosure. One or more computing devices (e.g., the computing environment 400) implement operations depicted in FIG. 5 by executing suitable program code (e.g., the graphics manipulation application 402). For illustrative purposes, the process 500 is described with reference to certain examples depicted in the figures. Other implementations, however, are possible.

At block 502, the process 500 involves receiving a brushstroke input within a digital canvas edited with a graphics manipulation application. One or more computing devices execute program code from the graphics manipulation application 402 to implement block 502. For instance, the graphics manipulation application 402 monitors, detects, receives, or otherwise accesses input data from one or more input devices. The input data includes one or more brushstroke inputs 417. In some embodiments, one or more event listeners include functions for detecting events generated by the input device 413 and recognizing these events as brushstroke inputs 417 or other editing events. In one example, an editing event listener 410 could determine that a touch input has been received in a portion of a graphical interface displaying a digital canvas and therefore classify that touch input as a brushstroke input 417. In another example, an editing event listener 410 could determine that a mouse click or drag has occurred while a cursor is positioned in a portion of a graphical interface displaying a digital canvas, and therefore classify that mouse event as a brushstroke input 417.

At block 504, the process 500 involves accessing brushstroke parameters that include a maximum alpha-deposition parameter and a fractional alpha-deposition parameter. One or more computing devices execute program code from the graphics manipulation application 402 to implement block 504. For instance, the graphics manipulation application 402 accesses the brushstroke parameters 412 that control modifications to color information and opacity data for a digital canvas responsive to a brushstroke input 417. The graphics manipulation application 402 accesses brushstroke parameters 412 from a suitable non-transitory computer-readable medium. In some embodiments, brushstroke parameters 412 are stored on one or more non-transitory computer-readable media of a computing device that executes the graphics manipulation application 402, and the graphics manipulation application 402 accesses the brushstroke parameters 412 via suitable communications over a local data bus connecting a processing device with the non-transitory computer-readable media. In additional or alternative embodiments, brushstroke parameters 412 are stored on one or more non-transitory computer-readable media remote from the computing device that executes the graphics manipulation application 402, and the graphics manipulation application 402 accesses the brushstroke parameters 412 via suitable communications over a data network connecting the computing device with the non-transitory computer-readable media.

At block 506, the process 500 involves computing an alpha flow increment from the maximum alpha-deposition parameter weighted with the fractional alpha-deposition parameter. One or more computing devices execute program code from the graphics manipulation application 402 to implement block 506. In some cases, the color deposition-and-mixing engine 420 uses the alpha flow increment to control the adjustment of the canvas opacity, as described herein with respect to block 514. Additionally or alternatively, the color deposition-and-mixing engine 420 uses the alpha flow increment to control the adjustment of the canvas color, as described herein with respect to block 516.

In some embodiments, the color deposition-and-mixing engine 420 computes the alpha flow increment based on, at least in part, a location within a brush stamp of the brushstroke input 417. For instance, the engine computes an initial alpha flow increment that is a product of the fractional alpha-deposition parameter 416 and a function of the maximum alpha-deposition parameter 414 and a location within a brush stamp of a brush tool used to perform the brushstroke input 417. An example of computing an initial alpha flow increment $F_a'$ is provided in Equation 1 below:

$$F'_a = \text{BrushStamp}(B_a', \ldots) \times B_f \qquad (1).$$

In Equation 1, the term $B_a'$ represents an initial value of a maximum alpha-deposition parameter, as selected via a parameter-adjustment input 415, and the term $B_f$ represents the fractional alpha-deposition parameter 416. The operation BrushStamp ($B_a', \ldots$) is a function that computes a maximum alpha-deposition parameter $B_a$ based at least in part on the user-specified value $B_a'$ of the maximum alpha-deposition parameter 414 and a location within a brush stamp of a brushstroke input 417. In some embodiments, BrushStamp ($B_a', \ldots$) includes input variables in addition to the user-specified value $B_a'$ and the location within the brush stamp. The color deposition-and-mixing engine 420 computes an alpha flow increment, at block 506, based on a difference between the initial alpha flow increment and a weighted value of a current canvas opacity. For instance, the color deposition-and-mixing engine 420 could select, as the alpha flow increment, a difference between the initial alpha flow increment and the current canvas opacity weighted with the initial alpha flow increment.

In some embodiments, a color-mixing algorithm executed at block 516 can use an alpha flow increment that is computed based on a pigment-replacement parameter 418. As noted above, an initial alpha flow increment can be computed that is a product of the fractional alpha-deposition parameter and a function of the maximum alpha-deposition parameter and a relative location within a brush stamp. The color deposition-and-mixing engine 420 can also compute an alpha flow reduction that is a difference between (i) the current canvas opacity and (ii) the current canvas opacity weighted with the pigment-replacement parameter. The color deposition-and-mixing engine 420 selects a difference between (i) the initial alpha flow increment and (ii) the alpha flow reduction weighted with the initial alpha flow increment. Thus, a user-specified value of the pigment-replacement parameter 418 can modify the value of the alpha flow increment, thereby controlling the output of the color-mixing algorithm.

For instance, an example of computing the alpha flow increment $F_a$, using the pigment-replacement parameter 418, based on a difference between the initial alpha flow increment and a weighted value of a current canvas opacity $C_a$ is provided in Equation 2 below:

$$F_a = F'_a - F'_a C_a \times (1-B_t) = F'_a \times (1-C_a \times (1-B_t)) \quad (2).$$

In Equation 2, the term $B_t$ represents the pigment-replacement parameter 418.

In the example provided by Equation 2, the pigment-replacement parameter 418 controls a degree to which a current canvas opacity offsets the contribution of the maximum alpha-deposition parameter 414 and the fractional alpha-deposition parameter 416 (i.e., the reduction in the initial alpha flow increment). Decreasing a value of the pigment-replacement parameter 418 can decrease the value of the alpha flow increment. For instance, as the current canvas opacity approaches 1 and the pigment-replacement parameter 418 approaches zero, the alpha flow increment approaches zero. Thus, decreasing the value of the alpha flow increment can reduce one or more of the alpha deposition applied by each brushstroke inputs (as described herein with respect to block 512) and the contribution of a brushstroke color to a color-mixing operation (as described herein with respect to block 516). Conversely, increasing the pigment-replacement parameter 418 can decrease the impact of the current canvas opacity in the computation of an alpha flow increment. For instance, setting the pigment-replacement parameter 418 to 1 in Equation 2 results in $F_a = F'_a \times (1-C_a(1-1)) = F'_a \times (1-C_a(0)) = F'_a \times (1-0) = F'_a$. Thus, as the pigment-replacement parameter 418 approaches 1, the alpha flow increment approaches the value of the initial alpha flow increment.

At block 508, the process 500 involves obtaining an output canvas opacity. One or more computing devices execute program code from the graphics manipulation application 402 to implement block 508. For instance, the color deposition-and-mixing engine 420 identifies a current canvas opacity by retrieving an alpha channel value or other value from a non-transitory computer-readable medium. The color deposition-and-mixing engine 420 determines, based at least in part on the identified current canvas opacity, whether to increase the canvas opacity or to maintain the current canvas opacity.

For example, at block 510, the process 500 involves determining whether a current canvas opacity is greater than or equal to the maximum alpha-deposition parameter. One or more computing devices execute program code from the graphics manipulation application 402 to implement block 510. For instance, the color deposition-and-mixing engine 420 identifies a maximum alpha-deposition by retrieving a value of the maximum alpha-deposition parameter 414 from a non-transitory computer-readable medium in which the value is stored. The stored value of the maximum alpha-deposition parameter 414 could be, for example, a default maximum alpha-deposition or a maximum alpha-deposition specified via one or more parameter-adjustment inputs 415 detected by the configuration event listener 408. The color deposition-and-mixing engine 420 compares the retrieved maximum alpha-deposition value to the current canvas opacity identified at block 508.

If the current canvas opacity is less than the maximum alpha-deposition parameter, the process 500 involves computing an adjusted canvas opacity as the output canvas opacity by increasing the current canvas opacity based on the alpha flow increment, as depicted at block 512. One or more computing devices execute program code from the graphics manipulation application 402 to implement block 512. For instance, the color deposition-and-mixing engine 420 could automatically execute one or more algorithms that receive, as inputs, one or more brushstroke parameters 412 and a current canvas opacity. The executed algorithm could constrain, based on the current canvas opacity, the adjusted canvas opacity derived from the maximum alpha-deposition parameter 414 and the fractional alpha-deposition parameter 416. The executed algorithm could output the adjusted canvas opacity. The color deposition-and-mixing engine 420 could set an "opacity" field value of the canvas display data to this adjusted canvas opacity.

In some embodiments, the color deposition-and-mixing engine 420 computes an increase in the current canvas opacity in a bounded manner. For instance, the color deposition-and-mixing engine 420 computes an interim canvas opacity that is the current canvas opacity adjusted by a value corresponding to the alpha flow increment. The value corresponding to the alpha flow increment can be computed in any suitable manner. One example of computing the interim canvas opacity $C_{a,adj}$ based on the alpha flow increment $F_a$ is provided in Equation 3 below:

$$C_{a,adj} = C_a - \mathrm{clamp}(C_a + F_a - B_a, 0, F_a) \quad (3).$$

In Equation 3, a clamping function clamp (•) restricts the extent to which the current canvas opacity $C_a$ is decreased to a value between zero and the alpha flow increment $F_a$. In this example, the color deposition-and-mixing engine 420 computes an output canvas opacity $C_{a,new}$ as $C_{a,new} = F_a + C_{a,adj}$. By extension, the output canvas opacity resulting from a given brushstroke input is limited to a range of values from the current canvas opacity, in which $\mathrm{clamp}(C_a + F_a - B_a, 0, F_a) = F_a$ and $F_a + C_{a,adj} = F_a + C_a - F_a = C_a$, to a sum of the current canvas opacity and the alpha flow increment, in which $\mathrm{clamp}(C_a + F_a - B_a, 0, F_a) = 0$ and $F_a + C_{a,adj} = F_a + C_a - 0 = F_a + C_a$.

If the current canvas opacity is greater than or equal to the maximum alpha-deposition parameter, the process 500 involves selecting the current canvas opacity as an output canvas opacity, as depicted at block 514. One or more computing devices execute program code from the graphics manipulation application 402 to implement block 514. For instance, the color deposition-and-mixing engine 420 could set an "opacity" field value of the canvas display data to the current canvas opacity.

At block 516, the process 500 involves computing an output canvas color from the alpha flow increment and the current canvas opacity. One or more computing devices execute program code from the graphics manipulation application 402 to implement block 516. For instance, the color deposition-and-mixing engine 420 could execute one or more color-mixing algorithms that compute a color mixing factor. The color-mixing algorithm could receive, as inputs, the alpha flow increment and the current canvas opacity. The algorithm could compute one or more color mixing factors based on the relative magnitudes of the alpha flow increment and the current canvas opacity.

In one example, an output canvas color could be a weighted combination of a current canvas color and a brush color selected for the brushstroke input 417. If the alpha flow increment is large relative to the current canvas opacity, the color deposition-and-mixing engine 420 can apply a larger weight (i.e., a color mixing factor or a different value derived from a color mixing factor) to the brush color and a smaller weight (i.e., the color mixing factor or a different value derived from a color mixing factor) to the current canvas color. If the alpha flow increment is small relative to the current canvas opacity, the color deposition-and-mixing engine 420 can apply a smaller weight to the brush color and a larger weight to the current canvas color.

In some embodiments, the color deposition-and-mixing engine 420 performs a color mixing operation having parameters computed from the alpha flow increment and the current canvas opacity. For instance, the color deposition-and-mixing engine 420 computes an interim canvas opacity that is the current canvas opacity adjusted by a value corresponding to the alpha flow increment. An example of computing this interim canvas opacity is provided above with respect to Equation 3 for block 512. The color deposition-and-mixing engine 420 also computes a color mixing factor indicating a contribution of the alpha flow increment to a combination of the alpha flow increment and the interim canvas opacity. In one example, the color deposition-and-mixing engine 420 could compute a color mixing factor m from as $m+F_a/(F_a+C_{a,adj})$.

The color deposition-and-mixing engine 420 selects, as the output canvas color, an output canvas color $C_{c,new}$ that is computed from the computed color mixing factor, the current canvas color $C_c$, and the brush color $B_c$. The color deposition-and-mixing engine 420 can execute the function ColorMix ($B_c$, $C_c$, m) to compute the output canvas color. An example of this ColorMix function is a sum of a current canvas color that is weighted based on the color mixing factor and a brush color selected for the brushstroke input that is differently weighted based on the color mixing factor. For instance, the ColorMix function could include the summing operation $C_{c,new}=mB_c+(1-m)C_c$.

At block 518, the process 500 involves modifying a portion of the digital canvas to which the brushstroke input is applied with updated canvas display data, which includes the output canvas color and the output canvas opacity. One or more computing devices execute program code from the graphics manipulation application 402 to implement block 518. For instance, the color deposition-and-mixing engine 420 can transmit the canvas display data 422 to a display device 428. In some embodiments, the display device 428 can be local to a computing device that executes the graphics manipulation application 402, and the graphics manipulation application can cause the canvas display data 422 to be transmitted over a local bus connecting a processing device to the display device 428. The display device 428, the computing device, or some combination thereof can render and display a modified digital canvas 430 in accordance with the canvas display data 422. In additional or alternative embodiments, the display device 428 can be a remote computing device that communicates, over a data network, with a computing device executing the graphics manipulation application 402. The graphics manipulation application can cause the canvas display data 422 to be transmitted over the data network to the remote computing device. The remote computing device can render and display a modified digital canvas 430 in accordance with the canvas display data 422.

Generating a modified digital canvas 430 in accordance with the canvas display data 422 can include, for example, increasing an opacity of an affected portion of the digital canvas to have the output canvas opacity 424. For instance, the modified digital canvas 430 can include pixels with alpha values equal to or otherwise corresponding to the output canvas opacity 424. These pixels can be included in the portion of the digital canvas to which the brushstroke input 417 was directed. Generating the modified digital canvas 430 in accordance with the canvas display data 422 can also include, for example, modifying color information at the affected portion of the digital canvas to have the output canvas color 426. For instance, the modified digital canvas 430 can include pixels with RGB values (or other color model values) equal to or otherwise corresponding to the output canvas color 426. These pixels can be included in the portion of the digital canvas to which the brushstroke input 417 was directed. In some embodiments, a single brushstroke input 417 can result in both the opacity and color of the affected digital canvas portion being modified in accordance with the canvas display data 422.

In some embodiments, the maximum alpha-deposition parameter used in process 500 is computed using the BrushStamp or another function for computing a maximum alpha-deposition parameter value based, as least in part, on a combination of a user-specified maximum alpha-deposition parameter and a relative location within a brush stamp. For instance, the color deposition-and-mixing engine 420 accesses an initial maximum alpha-deposition parameter value specified by a user input (e.g., a parameter-adjustment input 415) to the graphics manipulation application 402. The color deposition-and-mixing engine 420 identifies a brush stamp of a brush tool used to perform brushstroke inputs 417. As explained above, pixels within a boundary defined by the brush stamp are edited with the brushstroke input, with pixels outside the boundary remaining unaffected by a particular brushstroke input. The color deposition-and-mixing engine 420 calculates different values of the maximum alpha-deposition parameter at different locations within the boundary. For instance, the color deposition-and-mixing engine 420 applies the BrushStamp function, or some other suitable function, that outputs a particular value of the maximum alpha-deposition parameter based on the initial maximum alpha-deposition parameter value and a particular location within the boundary. Thus, first and second locations within the boundary can be used, in combination with the initial maximum alpha-deposition parameter value, to compute first and second values of the maximum alpha-deposition parameter. Computing the alpha flow increment, the output canvas opacity, and the output canvas color includes, for example, computing, for a different pixels edited by different relative location within a brush stamp of a brushstroke input, a different sets of values for the alpha flow increment, the output canvas opacity, and the output canvas color.

In the examples above, the output canvas opacity is computed or otherwise obtained in a manner that is constrained by a combination of the current canvas opacity and the brushstroke parameters. For instance, the initial alpha flow increment $F'_a$, is constrained by the fractional alpha-deposition parameter and the maximum alpha-deposition parameter, in that $B_f \leq 1$ and $BrushStamp(B'_a, \ldots)=B_a \leq B_a'$ results in $F_a' < B_a$. Similarly, the alpha flow increment $F_a$ is constrained by the pigment-replacement parameter, in that $0 \leq B_f \leq 1$ causes $F_a \leq B_a$.

The resulting output canvas opacity ($C_{a,new}=F_a+C_{a,adj}$) is also bounded. In the examples above, if $$C_a<B_a,$$

then $$C_a \leq C_{a,new} \leq B_a.$$

Otherwise, $$C_{a,new}=C_a.$$

The bounded nature of $C_{a,new}$ is shown as follows. Since $$0 \leq \text{clamp}(C_a+F_a-B_a,0,F_a) \leq \min(C_a+F_a-B_a,F_a),$$

then $$\text{clamp}(C_a+F_a-B_a,0,F\_a) \leq F_a.$$

Therefore:

$$C_a-F_a \leq C_{a,adj} \leq C_a-\min(C_a+F_a-B_a,F_a),$$

and $$C_a \leq F_a+C_{a,adj} \leq C_a-\min/(C_a+F_a-B_a,F_a)+F_a.$$

In a first case, $C_a+F_a-B_a>F_a$, which is equivalent to $C_a>B_a$. In this case, $$C_a \leq F_a+C_{a,adj} \leq C_a-F_a+F_a=C_a.$$

Thus, $$C_a \leq C_{a,new} \leq C_a.$$

Therefore, $C_{a,new}=C_a$. In a second case, $C_a+F_a-B_a<F_a$, which is equivalent to $C_a<B_a$. In this case, $$C_a \leq F_a+C_{a,adj} \leq C_a-(C_a+F_a-B_a)+F_a=B_a.$$

Therefore, $C_a \leq C_{a,new} \leq B_a$.

In both cases, the output canvas opacity (1) does not grow beyond the maximum alpha-deposition parameter $B_a$ (i.e., $C_{a,new} \leq B_a$), (2) does not decrease from a current canvas opacity $C_a$ (i.e., $C_a \leq C_{a,new}$), and (3) does not change if $C_a>B_a$. If the output canvas opacity $C_{a,new}$ does not change from the current canvas opacity (i.e., because $C_a>B_a$), the output canvas color $C_c$ can still change (i.e., a recoloring effect can be achieved) by being mixed with a brush color $B_c$ (e.g., using a color mixing factor that is computed based on $F'_a \times C\_a \times (1-B\_t)$).

Other implementations can also be used. For instance, other embodiments can compute an output canvas opacity using a $B_a$ and $C_a$ as a maximum, $B_f$ as fractional alpha-deposition, and $B_t$ as an amount of digital canvas color information that is replaced by brush color information.

Figure 6:
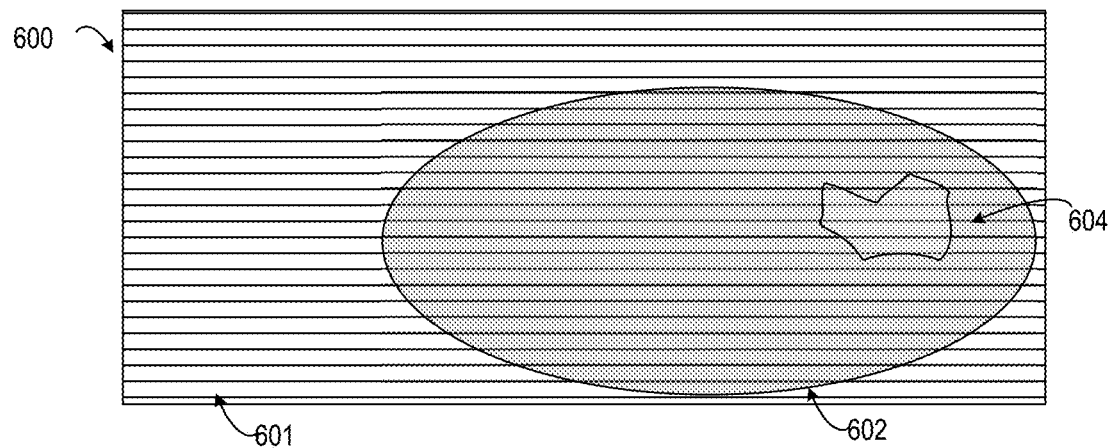
FIG. 6 depicts a digital canvas in which a graphical object can be modified in accordance with certain embodiments of the present disclosure.
Figure 7:
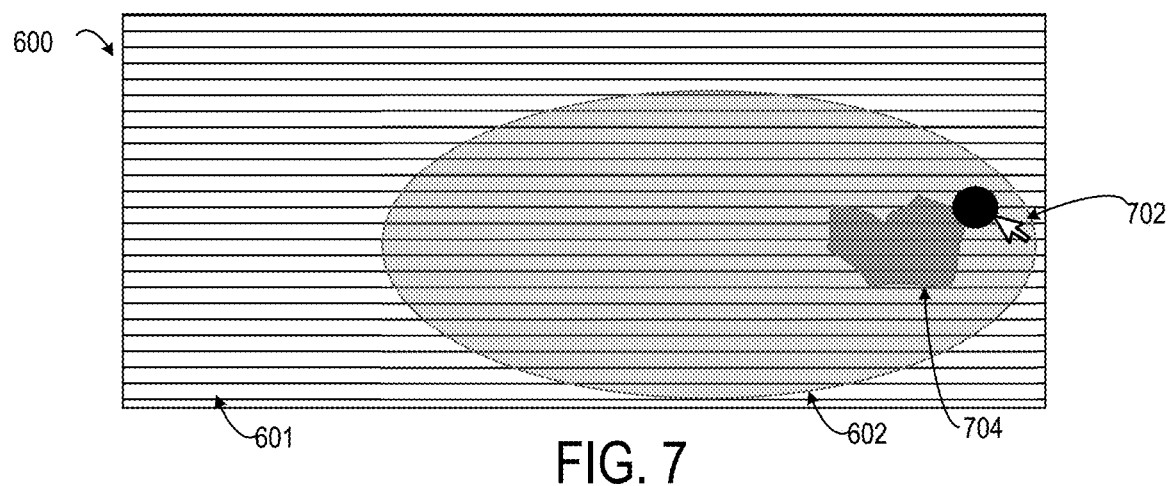
FIG. 7 depicts a modified version of the digital canvas from FIG. 6 after a digital overpainting operation has been performed in accordance with certain embodiments of the present disclosure.

FIGS. 6 and 7 depict a simplified example of performing digital overpainting using the process 500. FIG. 6 depicts a digital canvas 600 on which a graphical object 602 is positioned on top of a background 601. Graphical object 602 has a grey color and an opacity between 0 and 1, which allows the background 601 to be viewed through the partially transparent graphical object 602. This partial transparency can be seen in FIG. 6, where the horizontal lines of the background 601 are visible through the grey oval that is the graphical object 602. The graphical object 602 also includes a shape 604 with a lighter grey color and an opacity (i.e., current canvas opacity) similar to the rest of the graphical object 602.

Figure 2:
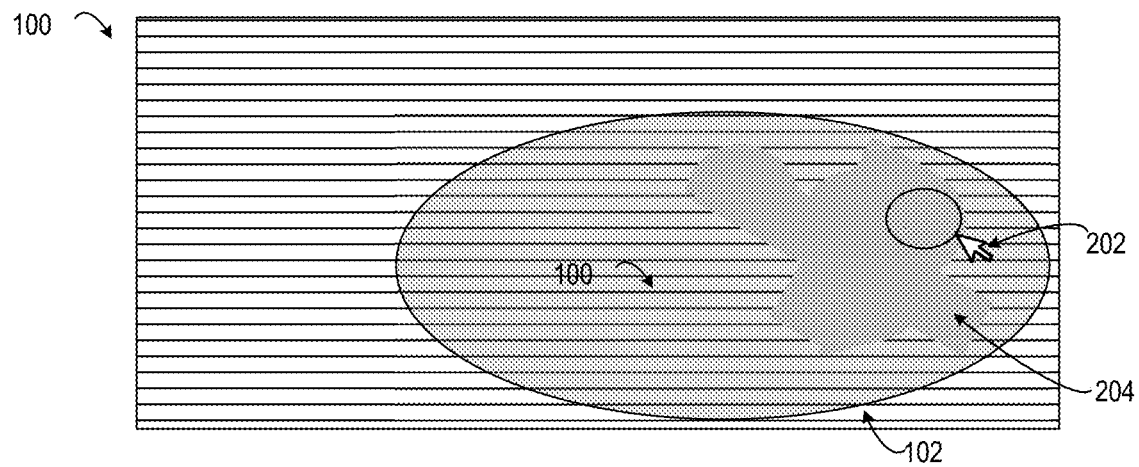
FIG. 2 depicts an example of a set of brushstroke operations that digitally overpaint a painted area in the digital canvas of FIG. 1 while undesirably changing an existing opacity of the digital canvas.
Figure 3:
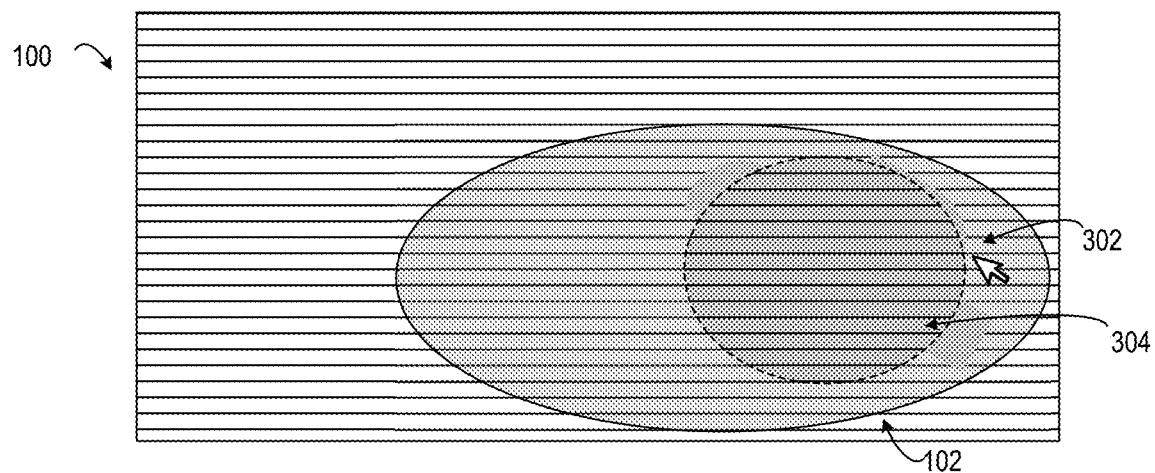
FIG. 3 depicts an example of an additional operation to modify the opacity of the overpainted area from FIG. 3 and to thereby complete the erasure of the painted area.

FIG. 7 depicts a modified version of the digital canvas 600 after a digital overpainting operation has been performed. The digital overpainting operation includes applying various brushstroke inputs with a brush tool 702. The brush tool 702 has been configured with a black color. In this example, applying the brushstroke inputs has mixed the lighter grey color of the shape 604 (i.e., an initial canvas color) with the black color of the brush tool 702 (i.e., a brush color) to form a dark grey color (i.e., an updated canvas color) of an updated shape 704. Furthermore, applying the brushstroke inputs has increased the opacity of the digital canvas 600 in the canvas portion at which the update shape 704 is located. However, by executing one or more digital overpainting operations described above with respect to FIGS. 4 and 5, the opacity has been increased gradually, such that the background 601 is still visible beneath the updated shape 704. Therefore, rather than a brush tool simply creating a fully opaque grey shape whose opacity must then be manually reduced (as in FIGS. 1-3) or erasing the shape 604 and having to redraw a shape 704, a set of brushstroke inputs from the brush tool 702 have efficiently and intuitively modified the coloring of the shape 604 to yield the shape 704 concurrently with gradual increases in opacity.

Computing System Example for Implementing Digital Overpainting

Figure 8:
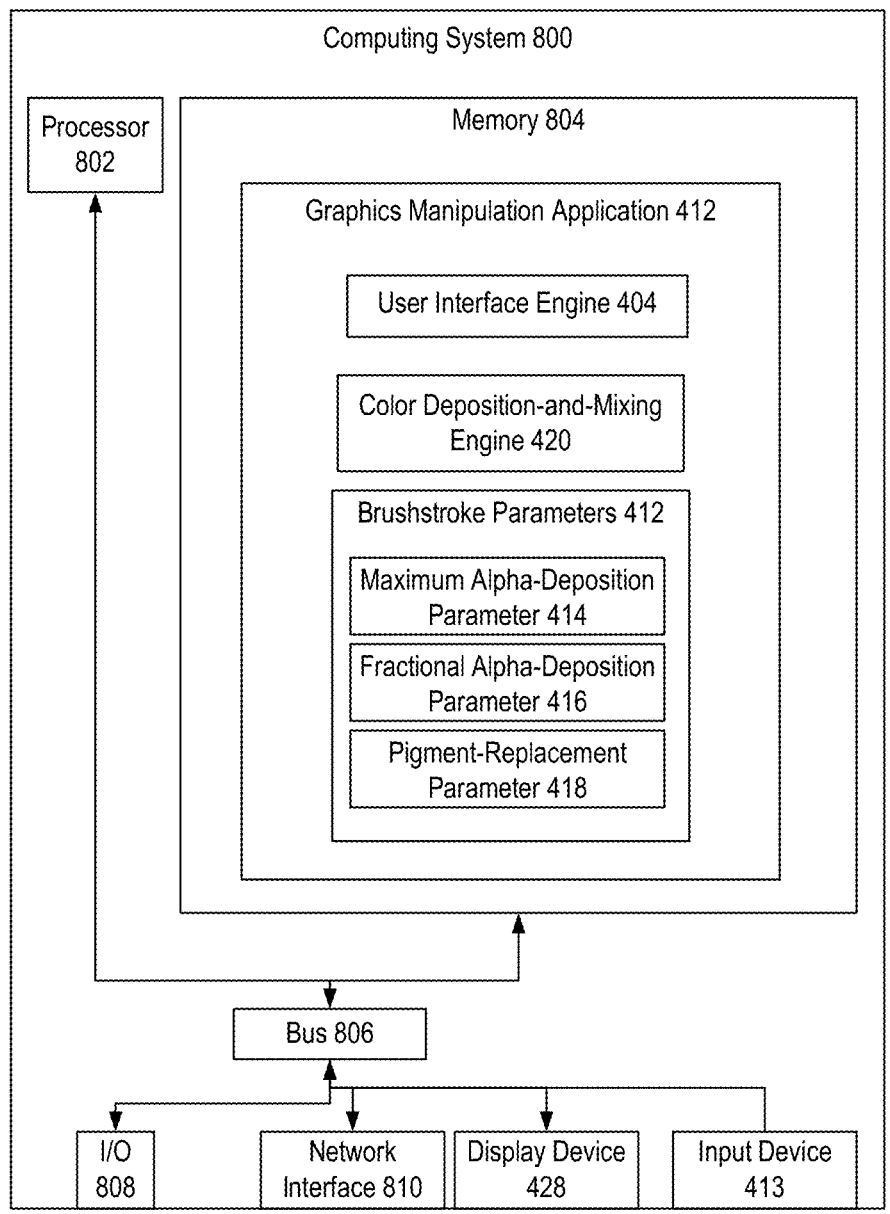
FIG. 8 depicts an example of a computing system that executes a graphics manipulation application for performing certain embodiments of the present disclosure.

Any suitable computing system or group of computing systems can be used for performing the operations described herein. For example, FIG. 8 depicts an example of a computing system 800 that can implement the computing environment of FIG. 4. In some embodiments, the computing system 800 includes a processing device 802 that executes the graphics manipulation application 402, a memory that stores various data computed or used by the graphics manipulation application 402, an input device 413 (e.g., a mouse, a keyboard, a touchpad, a touchscreen, etc.), and a display device 428 that displays graphical content generated by the graphics manipulation application 402. For illustrative purposes, FIG. 8 depicts a single computing system on which the graphics manipulation application 402 is executed, the brushstroke parameters 412 are stored, and the input device 413 and display device 428 are present. But these applications, datasets, and devices can be stored or included across different computing systems having devices similar to the devices depicted in FIG. 8.

The depicted example of a computing system 800 includes a processing device 802 communicatively coupled to one or more memory devices 804. The processing device 802 executes computer-executable program code stored in a memory device 804, accesses information stored in the memory device 804, or both. Examples of the processing device 802 include a microprocessor, an application-specific integrated circuit ("ASIC"), a field-programmable gate array ("FPGA"), or any other suitable processing device. The processing device 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as an input device 413, a display device 428, or other input or output devices. For example, the computing environment 400 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code that configures the processing device 802 to perform one or more of the operations described herein. The program code includes, for example, the graphics manipulation application 402 or other suitable applications that perform one or more operations described herein. The program code may be resident in the memory device 804 or any suitable computer-readable medium and may be executed by the processing device 802 or any other suitable processor. In some embodiments, all modules in the graphics manipulation application 402 (e.g., the user interface engine 404, the color deposition-and-mixing engine 420, etc.) are stored in the memory device 804, as depicted in FIG. 8. In additional or alternative embodiments, one or more of these modules from the graphics manipulation application 402 are stored in different memory devices of different computing systems.

In some embodiments, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices (e.g., a computing device that receives inputs for the graphics manipulation application 402 or displays outputs of the graphics manipulation application 402) via a data network using the network interface device 810.

An input device 413 can include any device or group of devices suitable for receiving visual, auditory, or other suitable input that controls or affects the operations of the processing device 802. Non-limiting examples of the input device 413 include a touchscreen, a mouse, a keyboard, a microphone, a separate mobile computing device, etc. A display device 428 can include any device or group of devices suitable for providing visual, auditory, or other suitable sensory output. Non-limiting examples of the display device 428 include a touchscreen, a monitor, a separate mobile computing device, etc.

Although FIG. 8 depicts the input device 413 and the display device 428 as being local to the computing device that executes the graphics manipulation application 402, other implementations are possible. For instance, in some embodiments, one or more of the input device 413 and the display device 428 can include a remote client-computing device that communicates with the computing system 800 via the network interface device 810 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method that includes performing, with one or more processing devices, operations comprising:
  accessing brushstroke parameters of a graphics manipulation application that include a maximum alpha-deposition parameter and a fractional alpha-deposition parameter, wherein the maximum alpha-deposition parameter controls a maximum change in opacity resulting from brushstroke inputs and the fractional alpha-deposition parameter controls a fraction of the maximum alpha-deposition parameter applied in each brushstroke input;
  receiving, by the graphics manipulation application, a first brushstroke input within a digital canvas having a first canvas opacity;

computing, based on the maximum alpha-deposition parameter exceeding the first canvas opacity, a second canvas opacity by increasing the first canvas opacity based on an alpha flow increment computed from the maximum alpha-deposition parameter and the fractional alpha-deposition parameter;

receiving, by the graphics manipulation application, a second brushstroke input within the digital canvas having the second canvas opacity;

selecting, based on the second canvas opacity exceeding the maximum alpha-deposition parameter, the second canvas opacity as an output canvas opacity; and updating display data in a portion of the digital canvas, to which the second brushstroke input is applied, to include the output canvas opacity and an output canvas color.

2. The method of claim 1, the operations further comprising:

computing the output canvas color from the alpha flow increment and the second canvas opacity; and modifying a portion of the digital canvas, to which the second brushstroke input is applied, to display the updated display data.

3. The method of claim 2, wherein the second brushstroke input is a single brushstroke input and, responsive to the single brushstroke input, wherein modifying the portion of the digital canvas to which the second brushstroke input is applied comprises, responsive to the single brushstroke input:

increasing an opacity of the portion of the digital canvas to the output canvas opacity; and modifying color information of the portion of the digital canvas to include the output canvas color.

4. The method of claim 2, wherein computing the output canvas color from the alpha flow increment and the second canvas opacity comprises:

computing an interim canvas opacity that is the second canvas opacity adjusted by a value corresponding to the alpha flow increment;

computing a color mixing factor indicating a contribution of the alpha flow increment to a combination of the alpha flow increment and the interim canvas opacity; and selecting, as the output canvas color, a sum of (i) a current canvas color that is weighted based on the color mixing factor and (ii) a brush color selected for the second brushstroke input that is differently weighted based on the color mixing factor.

5. The method of claim 1, the operations further comprising computing the alpha flow increment by performing operations comprising:

computing an initial alpha flow increment that is a product of (i) the fractional alpha-deposition parameter and (ii) a function of the maximum alpha-deposition parameter and a location within a stamp boundary of a brush tool used to perform a brushstroke input; and selecting, as the alpha flow increment, a difference between the initial alpha flow increment and a current canvas opacity weighted with the initial alpha flow increment.

6. The method of claim 1, the operations further comprising computing the alpha flow increment by performing operations comprising:

computing an initial alpha flow increment that is a product of (i) the fractional alpha-deposition parameter and (ii) a function of the maximum alpha-deposition parameter and a location within a stamp boundary of a brush tool used to perform the first brushstroke input;

computing an alpha flow reduction that is a difference between (i) a current canvas opacity and (ii) the current canvas opacity weighted with a pigment-replacement parameter controlling an amount of canvas color replaced by brush color from the first brushstroke input; and selecting, as the alpha flow increment, a difference between (i) the initial alpha flow increment and (ii) the alpha flow reduction weighted with the initial alpha flow increment.

7. The method of claim 1, wherein the operations further comprise computing the maximum alpha-deposition parameter that is used for computing the alpha flow increment, the output canvas opacity, and the output canvas color, wherein computing the maximum alpha-deposition parameter comprises:

accessing an initial maximum alpha-deposition parameter value specified by a user input to the graphics manipulation application;

identifying a brush stamp of a brush tool used to perform a brushstroke input, wherein pixels within a boundary defined by the brush stamp are editing with the brushstroke input; and calculating (i) a first value of the maximum alpha-deposition parameter from the initial maximum alpha-deposition parameter value and a first location within the boundary and (ii) a second value of the maximum alpha-deposition parameter from the initial maximum alpha-deposition parameter value and a second location within the boundary, the first value and the second value of the maximum alpha-deposition parameter being different for the first and second locations.

8. A computing system that includes performing, with one or more processing devices, operations comprising:

processing hardware; and a non-transitory computer-readable medium communicatively coupled to the processing hardware, wherein the processing hardware is configured to execute program code stored in the non-transitory computer-readable medium and thereby perform operations comprising:

accessing brushstroke parameters of a graphics manipulation application that include a maximum alpha-deposition parameter and a fractional alpha-deposition parameter, wherein the maximum alpha-deposition parameter controls a maximum change in opacity resulting from brushstroke inputs and the fractional alpha-deposition parameter controls a fraction of the maximum alpha-deposition parameter applied in each brushstroke input;

computing, based on the maximum alpha-deposition parameter exceeding a first canvas opacity with which a digital canvas of the graphics manipulation application is configured, a second canvas opacity for a first brushstroke input within the digital canvas, wherein computing the second canvas opacity comprises increasing the first canvas opacity based on an alpha flow increment computed from the maximum alpha-deposition parameter and the fractional alpha-deposition parameter;

selecting, for a second brushstroke input within the digital canvas having the second canvas opacity, the second canvas opacity as an output canvas opacity, wherein the second canvas opacity is selected as the output canvas opacity based on the second canvas opacity exceeding the maximum alpha-deposition parameter; and updating display data depicting a portion of the digital canvas to which the second brushstroke input is applied, wherein the updated display data includes the output canvas opacity and an output canvas color.

9. The computing system of claim 8, the operations further comprising:

computing the output canvas color from the alpha flow increment and the second canvas opacity; and modifying a portion of the digital canvas, to which the second brushstroke input is applied, to display the updated display data.

10. The computing system of claim 9, wherein the second brushstroke input is a single brushstroke input and, responsive to the single brushstroke input, wherein modifying the portion of the digital canvas to which the second brushstroke input is applied comprises, responsive to the single brushstroke input:

increasing an opacity of the portion of the digital canvas to the output canvas opacity; and modifying color information of the portion of the digital canvas to include the output canvas color.

11. The computing system of claim 9, wherein computing the output canvas color from the alpha flow increment and the second canvas opacity comprises:

computing an interim canvas opacity that is the second canvas opacity adjusted by a value corresponding to the alpha flow increment;

computing a color mixing factor indicating a contribution of the alpha flow increment to a combination of the alpha flow increment and the interim canvas opacity; and selecting, as the output canvas color, a sum of (i) a current canvas color that is weighted based on the color mixing factor and (ii) a brush color selected for the second brushstroke input that is differently weighted based on the color mixing factor.

12. The computing system of claim 8, the operations further comprising computing the alpha flow increment by performing operations comprising:

computing an initial alpha flow increment that is a product of (i) the fractional alpha-deposition parameter and (ii) a function of the maximum alpha-deposition parameter and a location within a stamp boundary of a brush tool used to perform the first brushstroke input; and selecting, as the alpha flow increment, a difference between the initial alpha flow increment and a current canvas opacity weighted with the initial alpha flow increment.

13. The computing system of claim 8, the operations further comprising computing the alpha flow increment by performing operations comprising:

computing an initial alpha flow increment that is a product of (i) the fractional alpha-deposition parameter and (ii) a function of the maximum alpha-deposition parameter and a location within a stamp boundary of a brush tool used to perform the first brushstroke input;

computing an alpha flow reduction that is a difference between (i) a current canvas opacity and (ii) the current canvas opacity weighted with a pigment-replacement parameter controlling an amount of canvas color replaced by brush color from the first brushstroke input; and selecting, as the alpha flow increment, a difference between (i) the initial alpha flow increment and (ii) the alpha flow reduction weighted with the initial alpha flow increment.

14. The computing system of claim 8, wherein the operations further comprise computing the maximum alpha-deposition parameter that is used for computing the alpha flow increment, the output canvas opacity, and the output canvas color, wherein computing the maximum alpha-deposition parameter comprises:

accessing an initial maximum alpha-deposition parameter value specified by a user input to the graphics manipulation application;

identifying a brush stamp of a brush tool used to perform a brushstroke input, wherein pixels within a boundary defined by the brush stamp are editing with the brushstroke input; and calculating (i) a first value of the maximum alpha-deposition parameter from the initial maximum alpha-deposition parameter value and a first location within the boundary and (ii) a second value of the maximum alpha-deposition parameter from the initial maximum alpha-deposition parameter value and a second location within the boundary, the first value and the second value of the maximum alpha-deposition parameter being different for the first and second locations.

15. A method in which one or more processing devices execute a graphics manipulation application and thereby perform operations comprising:

accessing brushstroke parameters that include a maximum alpha-deposition parameter and a fractional alpha-deposition parameter, wherein the maximum alpha-deposition parameter controls a maximum change in opacity resulting from brushstroke inputs and the fractional alpha-deposition parameter controls a fraction of the maximum alpha-deposition parameter applied in each brushstroke input;

receiving a brushstroke input within a digital canvas;

computing an alpha flow increment based on a location of the brushstroke input within a stamp boundary of a brush tool and from the maximum alpha-deposition parameter and the fractional alpha-deposition parameter;

computing an interim canvas opacity that is a current canvas opacity of the digital canvas adjusted by a value corresponding to the alpha flow increment;

computing a color mixing factor indicating a contribution of the alpha flow increment to a combination of the alpha flow increment and the interim canvas opacity;

computing an output canvas color based on a current canvas color, a brush color selected for the brushstroke input, and the color mixing factor; and updating display data in a portion of the digital canvas, to which the brushstroke input is applied, to include the output canvas color and an output canvas opacity.

16. The method of claim 15, further comprising:

receiving, by the graphics manipulation application, a prior brushstroke input within the digital canvas having a first canvas opacity;

computing, responsive to receiving the prior brushstroke input and based on the maximum alpha-deposition parameter exceeding the first canvas opacity, a second canvas opacity by increasing the first canvas opacity based on the alpha flow increment.

17. The method of claim 16, further comprising selecting, responsive to receiving the brushstroke input, the second canvas opacity as the output canvas opacity based on the second canvas opacity exceeding the maximum alpha-deposition parameter.

18. The method of claim 15, the operations further comprising computing the alpha flow increment by performing operations comprising:

computing an initial alpha flow increment that is a product of (i) the fractional alpha-deposition parameter and (ii) a function of the maximum alpha-deposition parameter and the location within the stamp boundary; and selecting, as the alpha flow increment, a difference between the initial alpha flow increment and the current canvas opacity weighted with the initial alpha flow increment.

19. The method of claim 15, the operations further comprising computing the alpha flow increment by performing operations comprising:

computing an initial alpha flow increment that is a product of (i) the fractional alpha-deposition parameter and (ii) a function of the maximum alpha-deposition parameter and the location within the stamp boundary used to perform the brushstroke input;

computing an alpha flow reduction that is a difference between (i) the current canvas opacity and (ii) the current canvas opacity weighted with a pigment-replacement parameter controlling an amount of canvas color replaced by brush color from the brushstroke input; and selecting, as the alpha flow increment, a difference between (i) the initial alpha flow increment and (ii) the alpha flow reduction weighted with the initial alpha flow increment.

20. The method of claim 15, wherein the operations further comprise computing the maximum alpha-deposition parameter that is used for computing the alpha flow increment, the output canvas opacity, and the output canvas color, wherein computing the maximum alpha-deposition parameter comprises:

accessing an initial maximum alpha-deposition parameter value specified by a user input to the graphics manipulation application; and calculating (i) a first value of the maximum alpha-deposition parameter from the initial maximum alpha-deposition parameter value and a first location within the stamp boundary and (ii) a second value of the maximum alpha-deposition parameter from the initial maximum alpha-deposition parameter value and a second location within the stamp boundary, the first value and the second value of the maximum alpha-deposition parameter being different for the first and second locations.

* * * * *